Feb. 12, 1952     J. H. CHADBOURNE     2,585,435
LOOM PICKER
Filed Sept. 7, 1945     2 SHEETS—SHEET 1
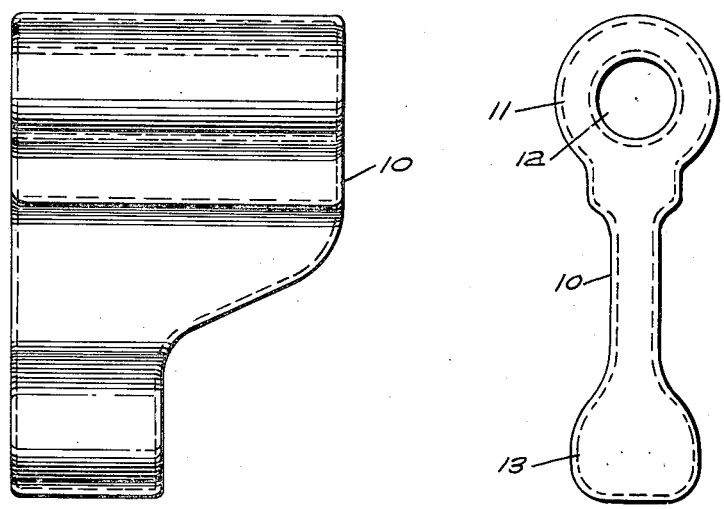
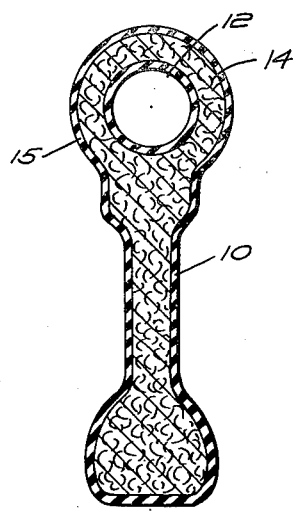
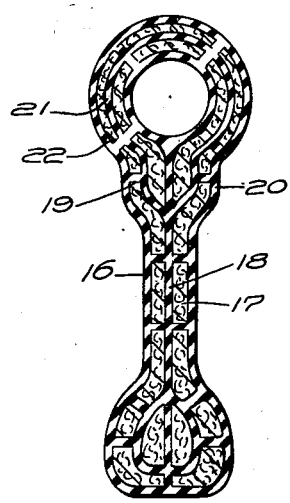
INVENTOR
Joseph H. Chadbourne
BY Nathaniel Frucht
ATTORNEY Feb. 12, 1952     J. H. CHADBOURNE     2,585,435
LOOM PICKER
Filed Sept. 7, 1945     2 SHEETS—SHEET 2
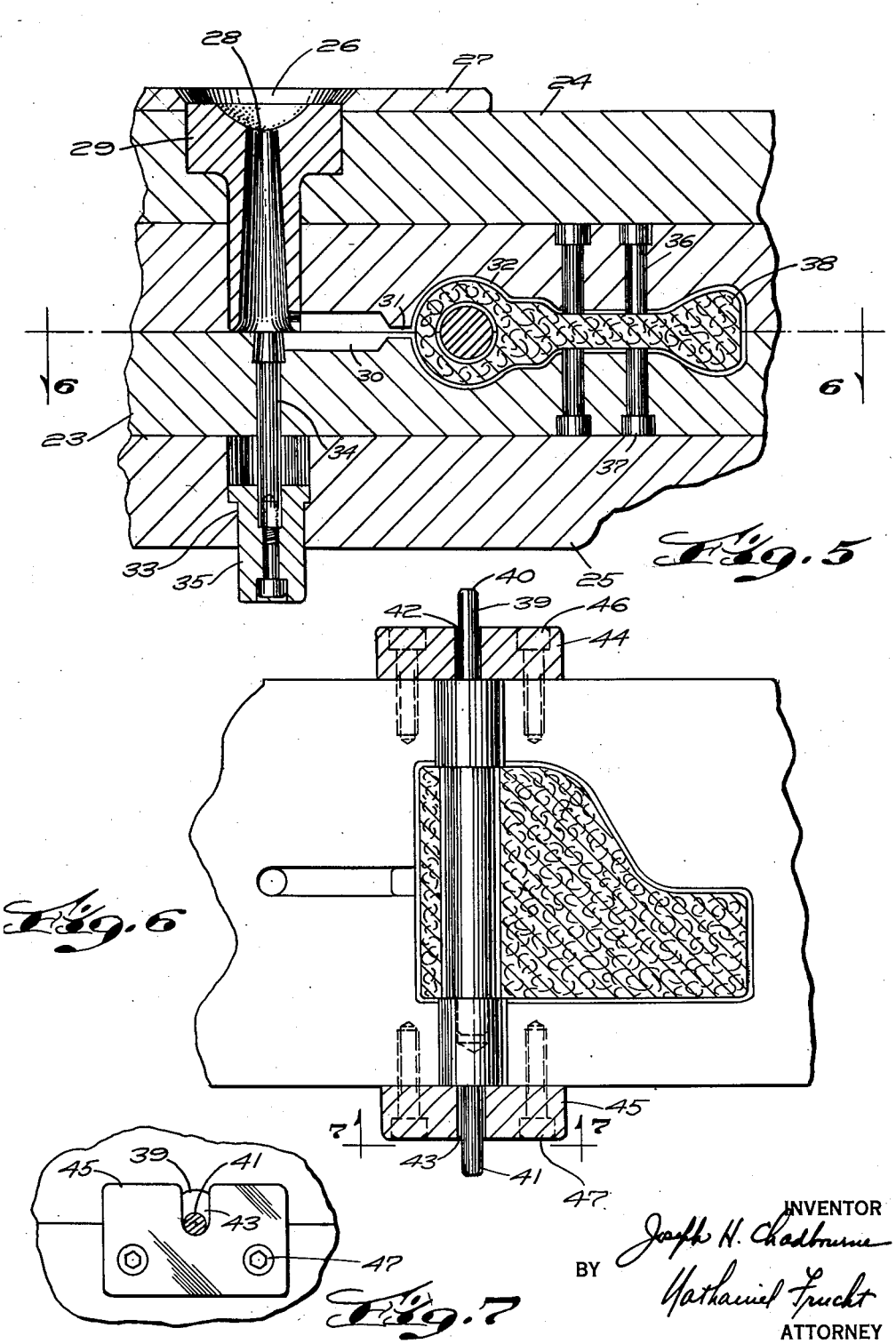
INVENTOR
Joseph H. Chadbourne
BY Nathaniel Frucht
ATTORNEY Patented Feb. 12, 1952

2,585,435

UNITED STATES PATENT OFFICE 2,585,435

LOOM PICKER

Joseph H. Chadbourne, Scotland, Conn.

Application September 7, 1945, Serial No. 614,847

2 Claims. (Cl. 139—160)

The present invention relates to the manufacture of machine parts for textile looms, and has particular reference to a novel manufacture for a picker.

The principal object of the invention is to provide a picker which has long life, great resistance to wear, and is not affected by moisture and other adverse atmospheric and operating conditions.

Another object of the invention is to provide a composite picker which has a core of fibrous material completely sheathed within a molded thermo-pressure responsive material, of both the thermo-setting and thermo-plastic type.

Further objects are to provide a novel mold and a novel method of molding a composite article having a core of fibrous material which retains all the inherent natural characteristics of the core while permanently locking the core in a sheath of thermo-pressure responsive material.

With the above and other objects and advantageous features in view, the invention consists of a novel arrangement of parts and a novel manufacturing procedure more fully disclosed in the detailed description following, in conjunction with the accompanying drawings, and more specifically defined in the claims appended thereto.

In the drawings:

Fig. 1 is a front elevation of the novel picker;

Fig. 2 is a side view thereof;

Fig. 3 is a vertical section thereof;

Fig. 4 is a vertical section showing a modified construction;

Fig. 5 is a vertical section through a novel mold;

Fig. 6 is a horizontal section of Fig. 5 on the line 6—6 thereof; and

Fig. 7 is a detail on the line 7—7 of Fig. 6.

It has been found desirable to provide a composite picker for a textile loom, which has a core of fibrous material, preferably rawhide, completely sheathed and encased in a thermo-pressure responsive material, such as nylon. I have devised a mold and a manufacturing procedure which encases the core within the thermo-pressure responsive material without change in the physical characteristics of the core, such as its resilience, toughness, and tensile strength. To this end, I form a core of fibrous material in the desired shape, and position the core within a mold so as to be centered therein; I then inject the thermo-pressure responsive material under suitable heat and pressure to completely sheathe and encase the core, and to impregnate the core with the thermo-pressure responsive material to a desired degree.

Referring to the drawings, the novel picker 10 includes a base 11 of standard form, having a transverse spindle hole 12, and an impact head 13, the picker having a core 14 of fibrous material, preferably rawhide, and an outer sheath 15 of thermo-pressure responsive material, preferably nylon, the thermo-pressure responsive material slightly impregnating and becoming bonded to the fibrous material, which as hereinafter described, retains its original natural physical characteristics, but is strengthened and rendered impervious to external atmospheric conditions by the sheathing.

If desired, the core may be in the form of spaced laminations and may be cross bonded. As shown in Fig. 4, the picker 16 has a core 17 of spaced laminations 18, with transverse passages 19 therethrough, so that the material of the sheath 20 extends between the laminations to provide layers 21, and also extends through the passages 19 to provide cross bonds 22, thus forming a very strong integral picker of composite material.

The preferred core material is rawhide, but any natural or synthetic textile material, such as cotton, wool, rayon, nylon or the like, may be used to form the core. The preferred sheath material is nylon, but any thermo-plastic or thermo-setting material may be used, such as polyvinyl butyral compounds, particularly of the thermo-setting type such as obtained by cross-linking with alcohol phenol solutions, and vinyl copolymers, including a compound known to the trade as "vinylite."

Since it is particularly desirable to protect the core without changing its natural physical characteristics, I find it desirable to sheathe the core by means of injection molding. When compression molding is used the mold and its contents are subjected to high heat, which changes the characteristics of the core, and makes it brittle, with a resulting reduction in tensile strength. Thus, the critical temperature for rawhide is about 220° F.; an increase in temperature above this value reduces the tensile strength of the core and reduces its resilience.

I therefore provide for injection molding of the thermo-pressure responsive material, which in the case of nylon, is normally heated to 510° F. to 525° F., but drops to about 150° F. during injection, the injection pressure being approximately 18,000 lbs. per square inch. The heating temperature for butyral is about 325° F., which drops to 130° F. during molding, the pressure being about 20,000 lbs. per square inch. I control the impregnation of the core with the thermo-pressure responsive material by regulating the temperature of the mold, one manner of accomplishing this being by use of water circulation to maintain the mold at a desired temperature, which controls the extent of impregnation of the core.

A preferred construction of injection mold is shown in Figs. 5, 6 and 7. The mold 23 is of the split type, with an upper injector section 24 and a lower ejector section 25, the injector section having an injection inlet 26 in a locating ring 27 which leads to an expanding conical feed line 28 in a sprue bushing 29 which communicates with an injection cavity 30 formed between the two sections and having a reduced inlet 31 to the mold cavity 32.

The ejector section 25 is provided with a bore 33 in which an ejector pin 34 is located, the outer end of the ejector pin 34 being secured to an ejector rod 35. The sections have aligned locating pins 36 and 37 which extend into the mold cavity in aligned relation, to engage the core 38, which has a mandrel 39 extending through the spindle opening. The mandrel 39 has reduced ends 40, 41 which are adapted to seat in slots 42, 43 of locating plates 44, 45 which are locked to the sides of the ejector section 25, as by bolts 46, 47.

The molding operation is accomplished by passing the mandrel through the spindle opening of the core and then setting the mandrel ends in the plate slots 42, 43, thus positioning the core in place in the lower ejector section 35, as the head end of the core seats on the pins 37. The injector section 24 is then lowered into place, and the core is firmly gripped by the upper locating pins 36 so that it is centered in the mold cavity 32. The thermo-pressure responsive material is now injected under pressure and flows around to completely encase the core, and to impregnate it to a desired degree depending on the temperature of the mold, which is maintained below the temperature at which any undesirable change in physical characteristics occurs.

It is preferred to use a core, but it may be desirable for certain articles, to make the article entirely of thermo-pressure responsive material, or to inject or blow in with the thermo-pressure responsive material loose fibers such as cotton, wool, or macerated animal, plant, or synthetic fibers, to be bonded into the thermo-pressure responsive material, and such articles are contemplated in my invention. Further, although I have disclosed the invention as for the manufacture of a picker, it is obvious that the invention may be applied to the manufacture of other articles, and that changes in the size, shape, and arrangement of the parts may be made to accord with the requirements for different articles and for different uses, without departing from the spirit and the scope of the invention as defined in the appended claims.

I claim:

1. A picker body having a rawhide core and an outer impact sheath of nylon material of substantial thickness which is bonded to the core and impregnated into the core material.

2. A picker body having a rawhide core and an outer impact sheath of nylon material of substantial thickness which is bonded to the core and impregnated into the core material, said core having passageways and said sheath material extending into said passageways.

JOSEPH H. CHADBOURNE.

REFERENCES CITED

The following references are of record in the file of this patent:

UNITED STATES PATENTS

| Number | Name | Date |
|---|---|---|
| 781,350 | Moser | Sept. 18, 1903 |
| 1,787,182 | Weiss | Dec. 30, 1930 |
| 1,852,812 | Leiby | Apr. 5, 1932 |
| 1,852,824 | Schroeder | Apr. 5, 1932 |
| 1,986,374 | Shippy | Jan. 1, 1935 |
| 1,998,356 | Brown | Apr. 16, 1935 |
| 2,199,144 | Tegarty | Apr. 30, 1940 |
| 2,201,706 | Sukohl | May 21, 1940 |
| 2,216,835 | Carothers | Oct. 8, 1940 |
| 2,222,353 | Lewis | Nov. 19, 1940 |
| 2,245,140 | Brahs | June 10, 1941 |
| 2,302,332 | Leekley | Nov. 17, 1942 |
| 2,356,585 | Hempel | Aug. 22, 1944 |
| 2,357,010 | Krenger | Aug. 29, 1944 |
| 2,419,086 | Norris | Apr. 15, 1947 |

FOREIGN PATENTS

| Number | Country | Date |
|---|---|---|
| 352,361 | Great Britain | July 9, 1931 |
| 352,522 | Great Britain | July 13, 1931 |